(12) United States Patent
Zwirn

(10) Patent No.: US 9,965,944 B1
(45) Date of Patent: May 8, 2018

(54) PROTECTIVE DEVICE FOR ALARM SYSTEMS

(71) Applicant: Jeffrey D. Zwirn, Tenafly, NJ (US)

(72) Inventor: Jeffrey D. Zwirn, Tenafly, NJ (US)

( * ) Notice: Subject to any disclaimer, the term of this patent is extended or adjusted under 35 U.S.C. 154(b) by 168 days.

(21) Appl. No.: 15/177,735

(22) Filed: Jun. 9, 2016

Related U.S. Application Data

(60) Provisional application No. 62/173,024, filed on Jun. 9, 2015.

(51) Int. Cl.
| | | |
|---|---|---|
| *G08B 29/06* | (2006.01) | |
| *G08B 29/18* | (2006.01) | |
| *G06F 13/42* | (2006.01) | |
| *G06F 11/30* | (2006.01) | |
| *G06F 11/32* | (2006.01) | |

(52) U.S. Cl.
CPC .......... *G08B 29/06* (2013.01); *G06F 11/3027* (2013.01); *G06F 11/327* (2013.01); *G06F 13/4282* (2013.01); *G08B 29/18* (2013.01)

(58) Field of Classification Search
CPC ...... G08B 29/06; G08B 29/18; G08B 29/185; G08B 21/18; G06F 11/3027; G06F 11/327; G01R 31/025; H04B 3/46; H04B 3/54; H04B 2203/5458; H02J 4/00
See application file for complete search history.

(56) References Cited

U.S. PATENT DOCUMENTS

| | | | | | |
|---|---|---|---|---|---|
| 4,477,798 | A | * | 10/1984 | Saul | G08B 23/00 340/309.7 |
| 5,097,259 | A | * | 3/1992 | Testa | G08B 29/06 340/3.42 |
| 5,687,391 | A | * | 11/1997 | Judd | G01D 21/02 340/3.44 |
| 5,754,103 | A | * | 5/1998 | Kanai | G08B 29/06 340/3.42 |
| 5,786,757 | A | * | 7/1998 | Right | G08B 26/001 340/10.34 |
| 6,735,496 | B1 | * | 5/2004 | Roman | H05B 1/023 219/486 |
| 6,973,594 | B2 | * | 12/2005 | Bennett | G06F 1/30 714/43 |

(Continued)

*Primary Examiner* — An Y Nguyen
(74) *Attorney, Agent, or Firm* — Fish & Richardson P.C.

(57) ABSTRACT

An example protective device for an alarm system includes a first connection interface configured to couple communicatively to a command module via a first communications bus, a second connection interface configured to couple communicatively to a communications module via a second communications bus, and a third connection interface configured to couple communicatively to one or more sensors or input devices via a third communications bus. The protective device is configured to receive, from a control module via the first communications bus, a first electrical signal corresponding to a command addressing the communications module. In response, the protective device transmits the first electrical signal to the communications module via the second communications bus. The protective device is also configured to detect a fault condition with respect to the third communication bus. In response, the protective device electrically isolates the first and second communications buses from the third communications bus.

18 Claims, 4 Drawing Sheets

(56) References Cited

U.S. PATENT DOCUMENTS

| | | | | |
|---|---|---|---|---|
| 8,675,324 | B2* | 3/2014 | Noguchi | G08B 26/005 |
| | | | | 361/63 |
| 9,319,101 | B2* | 4/2016 | Lontka | G01R 31/025 |
| 9,607,494 | B2* | 3/2017 | Pattok | |
| 2010/0302045 | A1* | 12/2010 | Foster | G08B 17/00 |
| | | | | 340/577 |
| 2011/0181992 | A1* | 7/2011 | Noguchi | G08B 26/005 |
| | | | | 361/63 |
| 2011/0289248 | A1* | 11/2011 | Djabbari | G06F 13/4072 |
| | | | | 710/110 |
| 2012/0324296 | A1* | 12/2012 | Hoffknecht | G06F 11/0745 |
| | | | | 714/48 |
| 2013/0049940 | A1* | 2/2013 | Carrieri | G08B 19/005 |
| | | | | 340/288 |
| 2013/0335139 | A1* | 12/2013 | Meah | G08B 25/045 |
| | | | | 327/581 |
| 2014/0091807 | A1* | 4/2014 | Lontka | G01R 31/025 |
| | | | | 324/509 |
| 2014/0092724 | A1* | 4/2014 | Lontka | G01R 31/025 |
| | | | | 370/221 |
| 2015/0020152 | A1* | 1/2015 | Litichever | H04L 63/14 |
| | | | | 726/1 |
| 2015/0091733 | A1* | 4/2015 | Bullmore | G08B 13/22 |
| | | | | 340/653 |
| 2016/0238649 | A1* | 8/2016 | Edwards | G01R 31/025 |
| 2016/0247386 | A1* | 8/2016 | Kim | H04B 3/56 |
| 2017/0054291 | A1* | 2/2017 | Qi | H02H 3/025 |

\* cited by examiner

PROTECTIVE DEVICE FOR ALARM SYSTEMS

CROSS-REFERENCE TO RELATED APPLICATION(S)

This application claims the benefit of priority of U.S. Provisional Patent Application No. 62/173,024, filed on Jun. 9, 2015, the contents of which are incorporated herein by reference in their entirety.

TECHNICAL FIELD

This disclosure relates to alarm systems, and more particularly to protecting alarm systems from damage and improving the effectiveness of alarm systems.

BACKGROUND

Alarm systems are often used to warn users of dangerous conditions. For example, in response to dangers such as smoke, fire, carbon monoxide, or security breaches, an alarm system can notify users through auditory and/or visual warnings. Thus, the user is alerted to the situation, and can take an appropriate course of action in response.

In some cases, an alarm system can communicate with a remote entity (e.g., an emergency responder or a central station that dispatches emergency responders) via a communications module (e.g., a digital alarm communicator transmitter, or DACT). As an example, an alarm system can include a communications module that establishes a connection via wired telephone line, a Voice Over Internet Protocol (VOIP) connection, or a cellular connection.

In many cases, each of the components of an alarm system are connected via a common data bus. For example, an alarm system can include a control panel, a communications module, one or more sensors, and one or more keypads, each interconnected via a common data bus. Use of a common data bus provides a single point of failure. For example, localized damage at one of the components (e.g., due to fire or tampering by an intruder at one of the keypads or sensors) can damage the common data bus, resulting in total disruption of communications between each of the components. As a result, the alarm system may be unable to communicate with the remote entity, despite that fact that its communications module remains intact.

SUMMARY

In general, in an aspect, a protective device for an alarm system includes a first connection interface configured to be coupled communicatively to a command module via a first communications bus, a second connection interface configured to be coupled communicatively to a communications module via a second communications bus, and a third connection interface configured to be coupled communicatively to one or more sensors or input devices via a third communications bus. The protective device is operable to receive, from a control module via the first communications bus, a first electrical signal corresponding to a command addressing the communications module. In response to receiving the first electrical signal, the protective device transmits the first electrical signal to the communications module via the second communications bus. The protective device is also operable to detect a fault condition with respect to the third communication bus. In response to detecting the fault condition, the protective device electrically isolates the first and second communications buses from the third communications bus.

Implementations of this aspect can include one or more of the following features.

In some implementations, the fault condition can be indicative of an electrical short along the third communications bus.

In some implementations, the fault condition can be indicative of an in-rush of electrical current into the third communications bus. The protective device can be configured such that electrical isolation of the first and second communications buses from the third communications bus prevents the in-rush of electrical current from entering the first and second communications buses.

In some implementations, the fault condition can be indicative of a disruption of the third communications bus.

In some implementations, the fault condition can be indicative of a thermal event with respect to the third communications bus. The protective device can be configured such that electrical isolation of the first and second communications buses from the third communications bus reduces a transfer thermal energy from the third communications bus to the first and second communications buses.

In some implementations, the third connection interface can be configured to communicatively couple to a plurality of sensors and/or input devices via the third communications bus.

In some implementations, the command can include instructions to transmit a message to a remote system.

In some implementations, the communications module can include a wireless radio.

In some implementations, the protective device can further include a fourth connection interface configured to be coupled communicatively to one or more additional sensors or input devices via a fourth communications bus. The protective device is configured to detect a fault condition with respect to the fourth communication bus, and responsive to detecting the fault condition, electrically isolate the first, second, and third communications buses from the fourth communications bus.

In some implementations, the protective device can be configured to receive, from one of the one or more sensors and/or input devices via the third communications bus, a second electrical signal corresponding to a message addressing the control module, and responsive to receiving the second electrical signal, transmitting the second electrical signal to the control module via the first communications bus.

In some implementations, the protective device can further include one or more fuses disposed between the second communications bus and the first and second communications buses. The one or more fuses can be operable to isolate the communications bus electrically from the first and second communications buses in response to the fault condition.

In some implementations, the protective device can further include one or more thermal breakers disposed between the second communications bus and the first and second communications buses. The one or more thermal breakers can be operable to isolate the communications bus electrically from the first and second communications buses in response to the fault condition.

In some implementations, the at least one of the first communications bus, second communications bus, and third communications bus can include a RS485 two wire loop.

In some implementations, the protective device can further include a fourth connection interface configured to be coupled communicatively to one or more additional devices via a fourth communications bus.

In some implementations, the protective device can further include one or more indicator lights. The one or more indicator lights can be operable to indicate visually, to a user, the detection of the fault condition.

In some implementations, the one or more indicator lights can be operable to indicate visually, to the user, that the fault condition was detected with respect to the third communication bus.

In some implementations, the first connection interface, the second connection interface, and the third connection interface can each include four wiring terminals.

One or more of the implementations described herein can provide various benefits. For instance, the protection module can enable an alarm system to communicate with a remote entity (e.g., an emergency responder, or a central station that dispatches emergency responders, such as a police or fire department), even if damage occurs to one or more of its data buses. As an example, a protection module can include protective mechanisms that thermally and/or electrically isolate one data bus from another upon the detection of a fault condition (e.g., a thermal event, a surge or in-rush of electrical current, or a short circuit). Thus, thermal and/or electrical damage to one data bus does not propagate into any of the other data buses. As another example, the protection module can enable an alarm system to communicate with one or more of its components, even if one or more of its data buses are disrupted.

The details of one or more implementations are set forth in the accompanying drawings and the description below. Other aspects, features and advantages will be apparent from the description and drawings, and from the claims.

DETAILED DESCRIPTION

Alarm systems are often used to warn users of dangerous conditions. For example, in response to dangers such as smoke, fire, carbon monoxide, or security breaches, an alarm system can notify users through auditory and/or visual warnings. In response, the user can take an appropriate course of action.

In some cases, an alarm system can contact a remote entity (e.g., a central station and/or central monitoring station, a remote user, a security provider, or an emergency responder) electronically so that the remote entity can take appropriate action. For instance, an alarm system can contact a remote entity via a communications module, such as a cellular radio. As an example, an alarm system can include a Global System for Mobile Communications (GSM) radio, a Code Division Multiple Access (CDMA) radio, or a High Speed Packet Data (HSPA) radio for communicating with remote systems (e.g., a central station and/or central monitoring station) via a wireless cellular network.

Figure 1:
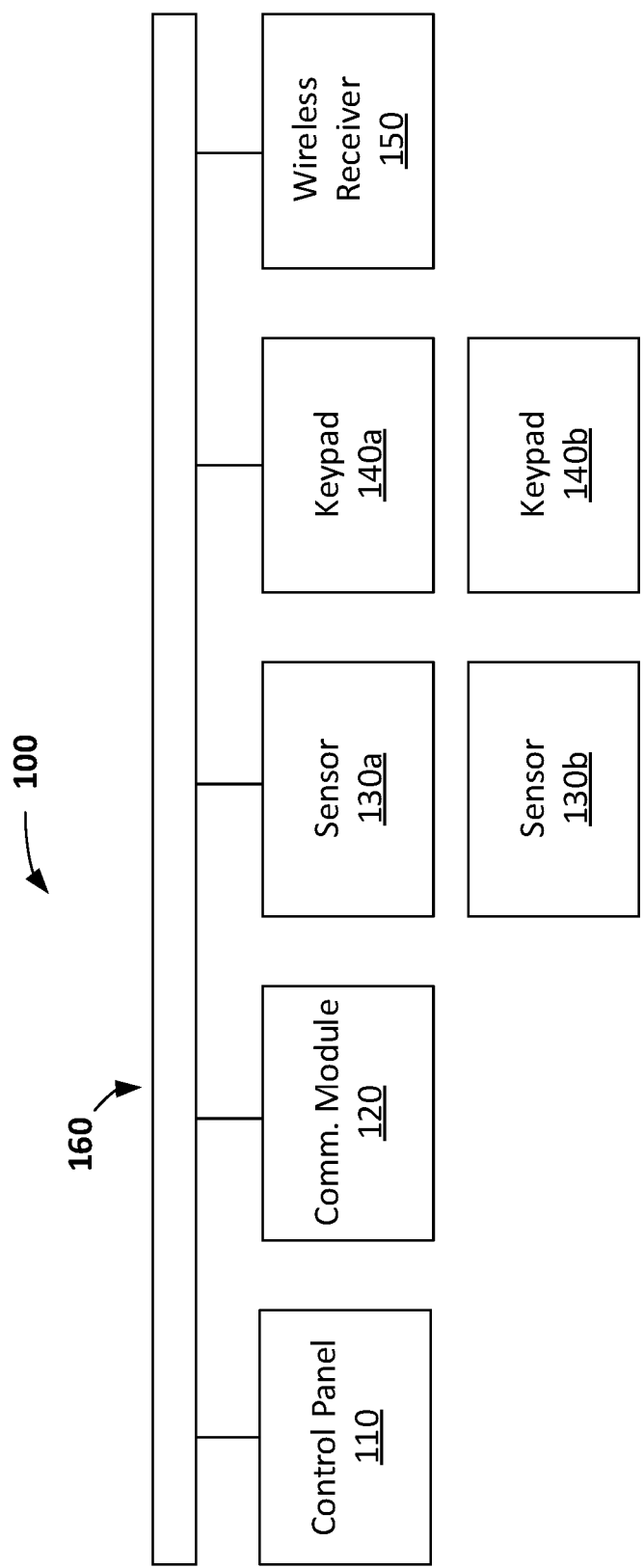
FIG. 1 is a diagram of an example alarm system.

In some cases, an alarm system includes a central control panel for coordinating the operation of one or more other components of the alarm system. For example, as shown in FIG. 1, an alarm system 100 can include a control panel 110, a communications module 120, sensors 130a and 130b, keypads 140a and 140b, and a wireless receiver 160.

The control panel 110 is communicatively coupled to the communications module 120, the sensors 130a and 130b, and the keypads 140a and 140b, either wirelessly or through a wireless connection. For example, in the example shown in FIG. 1, the control panel 110 is communicatively coupled to the communications module 120, the sensor 130a, the keypad 140a, and the wireless receiver 150 through a wired data bus 160, such that control panel 110 can send commands to and receive data from each of these components. As an example, a data bus can be implemented using a RS485 two wire loop operating within a voltage range between 4 VDC and 6 VDC.

The control panel 110 is also communicatively coupled to the sensor 130b and keypad 130b through a wireless connection established between the sensor 130b and keypad 130b and wireless receiver 160. As an example, the wireless receiver 160 can be a dual-diversity wireless receiver configured to establish a wireless connection with wireless transmitters included in the sensor 130b and keypad 140b.

The components of the alarm system 100 need not be in proximity with one another. For example, the control panel 110 can be at a first location (e.g., a central area of a structure), the communications module 120 and the wireless receiver 160 can be at a second location (e.g., an area of a structure that has clear access to cellular network signals and each of the wirelessly connected components of the alarm system), the sensor 130a can be at a third location (e.g., a room of the structure being monitored), the sensor 130b can be at a fourth location (e.g., another room of the structure being monitored), the keypad 140a can be at a fifth location (e.g., by an exit/entry door way to the structure or in a primary bedroom of the structure), and the keypad 140b can be at a sixth location (e.g., by another exit/entry door way to the structure or in a second bedroom of the structure). However, as a single data bus 160 is used to interconnect the components of the alarm system 100 (e.g., directly via the data bus 160, or indirectly via the wireless receiver 150 connected to the data bus 160), the data bus 160 is needed for the components to communicate with each other. Further, localized damage to the single data bus 160 (e.g., damage proximate to one component of the alarm system 100) can interfere with the other components' ability to communicate with each other, even if those components were not proximate to the damage. In some cases, this can be undesirable, as localized damage at one location (e.g., a fire at the sensor 130a or tampering by an intruder at the keypad 140a) can potentially prevent the control panel from communicating to a remote entity (e.g., a Network Operations Center—NOC, and/or a central station or central monitoring station) via the communications module 120. Thus, the remote entity would not be notified of the emergency situation, and as a result, would not dispatch emergency responders to the premises. Further, as the single data bus 160 is damaged, the control panel 110 is unable to communicate with the wireless receiver 150. Thus, the control panel 110 is unable to communicate with the sensor 130b and keypad 140b, despite the fact that these components are undamaged.

To protect against this possibility, an alarm system can incorporate a protection module. The protection module isolates damaged data buses from other data buses, such that the alarm system can continue to communicating with a remote entity, even despite the damage. Further, this isolation allows the alarm system to continue communicating with its wireless sensors and keypads, despite the data bus damage.

Figure 2:
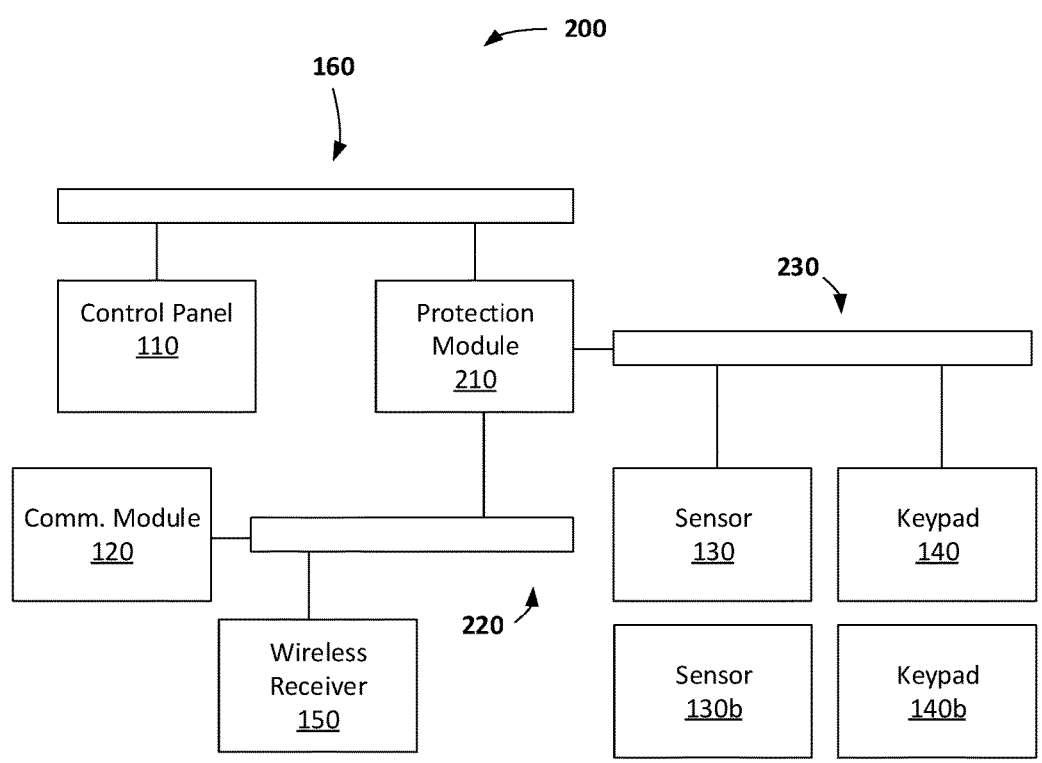
FIG. 2 is a diagram of an example alarm system having a protection module.

An example alarm system 200 having a protection module 210 is shown in FIG. 2. As with the alarm system 100 shown in FIG. 1, the alarm system 200 includes a control panel 110, a communications module 120, sensors 130*a* and 130*b*, keypads 140*a* and 140*b*, a wireless receiver 150, and a data bus 160. However, in this example, the data bus 160 communicatively couples the control panel 110 to the protection module 210. The protection module is in turn communicatively coupled to the communications module 120 and the wireless receiver 150 (and in turn indirectly coupled to the sensors 130*b* and keypad 130*b*) by a second data bus 220, and communicatively coupled to the sensor 130*a* and the keypad 140*a* by a third data bus 230.

The protection module 210 is operable to receive commands from the control panel 110 addressed to the communications module 120, sensors 130*a* and 130*b*, keypads 140*a* and 140*b*, and/or the wireless receiver 150 from the data bus 160, and is operable to transmit the commands to the appropriate component. Further, the protection module 210 receives data from the communications module 120, sensors 130*a* and 130*b*, keypads 140*a* and 140*b*, and/or the wireless receiver 150 from the data buses 220 and 230, and transmits the data to the control panel 110. However, as the communications module 120 and the wireless receiver 150 are on a different data bus than that of the sensor 130*a* and keypad 140*a*, localized damage to one data bus is less likely to damage the other data bus. For example, localized damage at one location (e.g., a fire at the sensor 130*a* or tampering by an intruder at the keypad 140*a*) can potentially prevent the control panel from communicating with those damaged components. However, in response, the control panel 110 can transmit to the communications module 120 (e.g., instructing the communications module 120 to transmit a message to a remote entity). Similarly, the control panel 110 can continue receiver sensor and keypad data from the sensor 130*b* and the keypad 140*b*. In this manner, the data buses 220 and 230 are isolated from each other, such that damage to one is less likely to damage the other.

In some cases, the protection module can include protective mechanisms that thermally and/or electrically isolate one data bus from another upon the detection of a fault condition (e.g., a thermal event, a surge or in-rush of electrical current, a short circuit, and so forth). For example, the protection module 210 can include thermal breakers and/or electrical fuses that prevent thermal energy and/or electrical surges from one data bus from propagating to another data bus. In this manner, even if one or more data buses are disrupted, the control panel 110 can continue to communicate with other components on each of the other data buses. In some cases, the protection module can provide high impedance isolation (e.g., through a series pass isolation circuit).

Although the protection module 210 is illustrated as providing two additional data buses, this is merely an illustrative example. In practice, a protection module can include three, four, five, or more additional data buses in order to further isolate components from each other. Likewise, although a single control panel 110, a single communications module 120, two sensors 130*a* and 130*b*, two keypads 140*a* and 140*b*, and a single wireless receiver 150 are shown, in practice, an alarm system can include any number of each of these components (e.g., one, two, three, or more), and some components may be omitted in some implementations.

Implementations of the protection module can provide various benefits. For example, the protection module can enable an alarm system to communicate with a remote entity (e.g., an emergency responder) and/or continue receiving sensor or keypad data, even if damage occurs to one or more of its data buses.

To illustrate, an alarm system can include, for example, a control panel positioned in a first room of a house, a communications module positioned proximate to the control panel, a wired keypad positioned by an entrance of the house, and a wired sensor positioned in a second room of the house. If a fire occurs in the second room, the fire may destroy the sensor and the wiring between the sensor and the control panel. Thus, the data bus extending between the sensor and the control panel is disrupted. If the control panel, the communications module, the wired sensor, and the wired keypad are communicatively coupled through a single data bus (e.g., as shown in FIG. 1), this disruption severs communication between the control panel and each of the remaining components of the alarm system. Thus, the control panel is unable to send a warning message (e.g., a message to an emergency responder and/or a central station) via the communications module, even though both of the components are still intact. Further, as the data bus is disrupted, the wireless receiver cannot communicate with each of the wireless sensors and keypads, thereby further limiting the effectiveness of the alarm system (e.g., impairing the alarm system's ability to detect dangerous conditions and/or receiver user input).

However, when the protection module is installed, the control panel is communicatively coupled to the communications module and the wireless receiver via a first data bus, and communicatively coupled to the wired sensor and the wired keypad via a second data bus. Thus, even if a fire disrupts the second data bus, the control panel can still communicate with the communications module via the first data bus. As a result, the control panel can send a warning message to a remote entity via the communications module. Further, as the control panel and the wireless receiver are also connected via the first data, the control panel can continue communicating with each of the wireless sensors and keypads. As a result, the control panel can continue gathering sensor and input information, despite damage to the second data bus.

As another example, an intruder may attempt to circumvent the alarm system by tampering with the wired keypad (e.g., by applying a high electric current to the keypad in an attempt to destroy the keypad and disrupt the data bus, or by physically removing the keypad from the data bus). If the control panel, the communications module, the wireless receiver, the wired sensor, and the wired keypad are communicatively coupled through a single data bus (e.g., as shown in FIG. 1), this tampering can sever communication between the control panel and each of the remaining components of the alarm system. Thus, the control panel is unable to send a warning message (e.g., a message to an emergency responder) via the communications module, even though both of the components are still intact. Further, as the data bus is disrupted, the wireless receiver cannot communicate with each of the wireless sensors and keypads, thereby further limiting the effectiveness of the alarm system.

However, when the protection module is installed, the control panel is communicatively coupled to the communications module and the wireless receiver via a first data bus, and communicatively coupled to the wired sensor and the wired keypad via a second data bus. Thus, even if an intruder damages the second data bus, the control panel can still communicate with the communications module via the first data bus. As a result, the control panel can send a warning message via the communications module. Further, as the control panel and the wireless receiver are also connected via the first data, the control panel can continue communicating with each of the wireless sensors and keypads. As a result, the control panel can continue gathering sensor and input information, despite damage to the second data bus.

Figure 3:
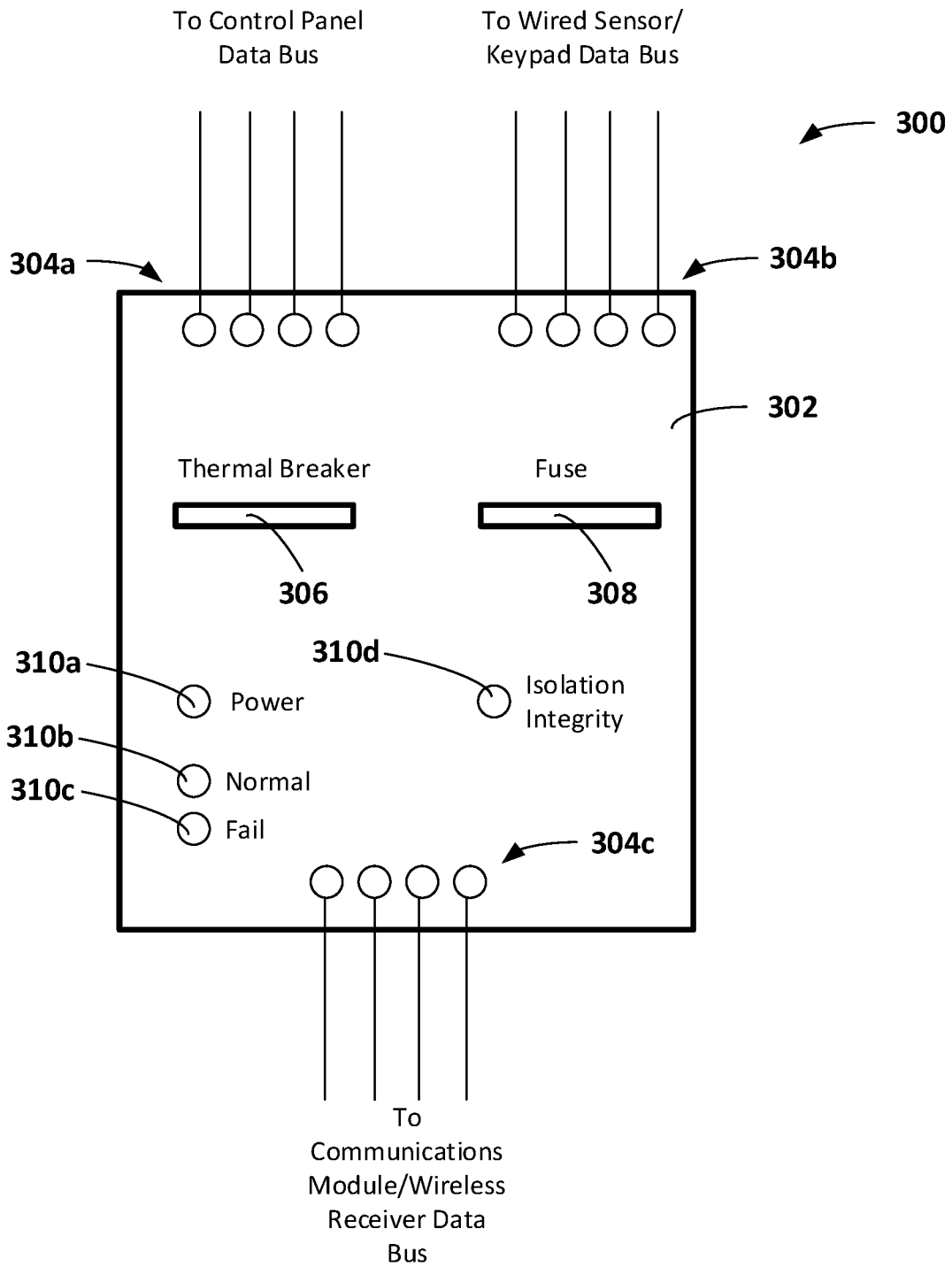
FIG. 3 is a diagram of an example protection module.

Another example implementation of a protection module 300 is shown in FIG. 3. In some respects, the protection module 300 can be similar to the protection module 210 described with respect to FIG. 2. As shown in FIG. 3, the protection module 300 includes a housing 302, three connection interfaces 304a-c, a thermal breaker 306, a fuse 308, and indicator lights 310a-d.

The connection interfaces 304a-c provides a physical interface for communicatively coupling the protection module 300 to one or more data buses. For example, the protection module 300 can be connected to a first data bus via the connection interface 304a, connected to a second data bus via the connection interface 304b, and connected to a third data bus via the connection interface 304c. As described herein, the protection module 300 can communicate to different components of an alarm system through each of the data buses. For example, the protection module 300 can communicate to a control panel via the first data bus (through the connection interface 304a), communicate to one or more wired sensors and/or keypads via the second data bus (through the connection interface 306b), and communicate to a communications module and wireless receiver via the third data bus (through the connection interface 306c).

The connection interfaces 304a-c can include any mechanism for physically coupling the protection module 300 to a data bus. For example, as shown in FIG. 3, each connection interface 304a-c can include four wiring terminals (e.g., post-style or barrier-style wiring terminals), through which the conductive wires of a data bus are attached. In some cases, two of the terminals can deliver electrical power to the data bus (e.g., 12 VDC electrical current), and two of the terminals can send data communications to the data bus and/or receive data from the data bus (e.g., via electrical signals corresponding to commands, measurement data, and/or other information addressed to one or more of the components of the alarm system). Although each connection interface 304a-c is depicted as having four terminals, this is merely an illustrative example. In practice, each connection interface 304a-c can be any number of terminals (e.g., one, two, three, four or more thermals).

As described herein, the protection module 300 can include protective mechanisms that thermally and/or electrically isolate one data bus from another upon the detection of a fault condition (e.g., a thermal event, a surge or in-rush of electrical current, or a short circuit). Thus, thermal and/or electrical damage to one data bus does not propagate into any of the other data buses, and the undamaged data buses remain available for use by the control panel.

For instance, as shown in FIG. 3, the protection module 300 includes a thermal breaker 306. The thermal breaker 306 is positioned between the connection interfaces 304a-c, and thermally isolates one or more of the connection interfaces 304a-c in response to a thermal event (e.g., an increase in temperature at one of the connection interfaces 304a-c). Thus, the thermal breaker 306 reduces the transfer of thermal energy from one connection interface 304a-c to each of the other connection interfaces 304a-c.

To illustrate, a fire may heat up the wiring associated with the second data bus. This heat travels along the wiring to the connection interface 304b, heating up the connection interface 304b. When the connection interface 304b becomes sufficiently hot (e.g., over a threshold temperature), the thermal breaker 306 isolates the connection interface 304b from the other connection interfaces 304a and 304c. Thus, the heat from the connection interface 304b does not substantially transfer to the other connection interfaces 304a and 304c, thereby protecting the connection interfaces 304a and 304c from thermal damage.

In some cases, the thermal breaker 306 can be a single-use component that must be replaced after it is activated (e.g., "tripped") by a thermal event. In some cases the thermal breaker 306 can be a multi-use component that can be reset after it is activated by a thermal event (e.g., "reset" after being "tripped"). In some cases, the thermal breaker 306 can include a heat-sensitive electrical component (e.g., a negative temperature coefficient thermistor) to detect changes in temperature.

In some cases, the temperature at each connection interface 304a-c can be monitored by a data processing module (e.g., a computer processor), and the data processing module can automatically "trip" and/or "reset" the thermal breaker 306 in response to the measured temperature. For example, the data processing module can determine that the temperature has increased beyond a threshold value, and in response, the data processing module can automatically instruct the thermal breaker 306 to open and prevent the increase in thermal energy from propagating to other data buses.

Although one thermal breaker 306 is shown in FIG. 3, this is merely an illustrative example. In practice, the protection module 300 can include any number of thermal breakers (e.g., one, two, three, four or more), or none at all.

As shown in FIG. 3, the protection module 300 also includes a fuse 308. The fuse 308 is positioned between the connection interfaces 304a-c, and electrically isolates one or more of the connection interfaces 304a-c in response to an electrical event (e.g., an electrical short, or a spike or in-rush of electrical current at one of the connection interfaces 304a-c). Thus, the fuse 308 reduces the transfer of undesirable electrical energy from one connection interface 304a-c to each of the other connection interfaces 304a-c.

To illustrate, an intruder may attempt to circumvent an alarm system by applying a high electric current to a keypad connected to the second data bus. This current travels along the wiring to the connection interface 304b. If the current and/or voltage reaching the connection interface 304b is sufficiently high (e.g., over a threshold current and/or threshold voltage), the fuse 308 isolates the connection interface 304b from the other connection interfaces 304a and 304c. Thus, the current from the connection interface 304b does not substantially transfer to the other connection interfaces 304a and 304c, thereby protecting the connection interfaces 304a and 304c from electrical damage.

As another example, a fire may damage the wiring of the second data bus, resulting in an electrical short and a sharp increase of electrical current along one of more of the wires (e.g., a short between a power supplying wire and a data supplying wire, resulting in a surge of electrical current along the data supplying wire). This current travels along the wiring to the connection interface 304b. If the current reaching the connection interface 304b is sufficiently high (e.g., over a threshold current), the fuse 308 isolates the connection interface 304b from the other connection interfaces 304a and 304c. Thus, the current from the connection interface 304b does not substantially transfer to the other connection interfaces 304a and 304c, thereby protecting the connection interfaces 304a and 304c from electrical damage.

In some cases, the fuse 308 can be a single-use component that must be replaced after it is activated (e.g., "tripped") by an electrical event. In some cases, the fuse 308 can be a multi-use component that can be reset after it is activated by an electrical event (e.g., "reset" after being "tripped").

In some cases, the current and/or voltage at each connection interface 304a-c can be monitored by a data processing module (e.g., a computer processor), and the data processing module can automatically "trip" and/or "reset" the fuse 308 in response to the measured current and/or voltage. For example, the data processing module can determine that the voltage has increased beyond a threshold value, and in response, the data processing module can automatically instruct the fuse 308 to open and prevent the in-rush of current from propagating to other data buses.

Although one fuse 308 is shown in FIG. 3, this is merely an illustrative example. In practice, the protection module 300 can include any number of fuses (e.g., one, two, three, four, or more), or none at all.

As shown in FIG. 3, the protection module 300 also includes several indicator lights 304a-d. The indicator light 304a-d provide information to a user regarding the operational status of the protection module 300.

For example, the indicator light 310a can indicate the power state of the protection module 300 (e.g., by illuminating when the protection module 300 is on, and not illuminating when the protection module is off).

As another example, the indicator light 310b can indicate when the protection module 300 is operating in a "normal" state (e.g., by illuminating when the protection module 300 determines that each of the data buses are undamaged, and/or when the thermal breaker 306 and fuse 308 have not been tripped), and the indicator light 310c can indicate when the protection module 300 is operating in a "failure" state (e.g., by illuminating when the protection module 300 determines that one or more of the data buses are damaged, and/or when the thermal breaker 306 and/or fuse 308 have been tripped).

As another example, the indicator light 310d can indicate when the isolation integrity of protection module 300 is intact (e.g., by illuminating when the thermal breaker 306 and fuse 308 are functional and operating in accordance with their specifications).

Although four indicator lights 304a-d are shown in FIG. 3, these are merely illustrative examples. In practice, the protection module 300 can include any number of indicator lights (e.g., one, two, three, four, or more) to provide information regarding any aspect of the protection module 300. As an example, the protection module 300 can include additional indicator lights that specifically identifies which data bus is damaged, such that the user can inspect that particular data bus for damage.

In some cases, the protection module 300 can provide information to the user through auditory alerts. For example, the protection module 300 can include an audio speaker than generates an auditory alert (e.g., a beeping or chirping sound) when the protection module 300 is operating a "failure" state (e.g., when the protection module 300 determines that one or more of the data buses are damaged, when a fault condition has been detected, and/or when the thermal breaker 306 and/or fuse 308 have been tripped). This can be beneficial, for example, as it alerts users to the failure condition, even if the user is not looking directly at the protection module 300. In some cases, the protection module 300 can provide authority alerts either instead of or in addition to the use of indicator lights.

Although an example auditory alert is described above, this is merely an illustrative example. In practice, the protection module 300 can generate any number of auditory alerts to provide information regarding any aspect of the protection module 300. As an example, the protection module 300 can generate auditory alerts that specifically identify which data bus is damaged (e.g., by "announcing" which data bus is damaged), such that the user can inspect that particular data bus for damage.

In some cases, the protection module 300 can be installed near a control panel (e.g., adjacent to the control panel or within a few feet of the control panel). In some cases, the protection module can be installed remote from the control panel (e.g., in a separate room). In some cases, the protection module can be installed near a communications module and/or the wireless receiver. In some cases, the protection module can be installed remote from the communications module and/or the wireless receiver. In some cases, the protection module 300 can be installed before the installation of the communications module and/or the wireless receiver. In some cases the protection module 300 can be installed after the installation of the communications module and/or the wireless receiver. In some cases, the protection module 300 can be installed inside the control panel (e.g., within the housing of the control panel) or implemented as a part of the control panel.

When the protection module 300 is installed and configured for operation, a fire condition shorting out the data bus, and/or an intentional act caused by an intruder shorting out the data bus will not disable the communications module and/or wireless receiver. As a result, the communications module will still be able to successfully function and communicate alarm and trouble signals to a remote entity (e.g., a central monitoring station or an emergency responder). Further, the wireless receiver will still be able to retrieve sensor and input information from wirelessly connected sensors nad keypads.

In some cases, the data bus wiring that connects to the components in the field (e.g., the components remote from the control panel, such a wired keypad or a wired sensor) can be installed throughout a protected premises. In some cases, each of the components in the field can operate using a multiplex format. In some cases, each of the components in the field can be a powered device that is part of a normally closed and/or a normally open protective loop circuit. In some cases, the components in the field can be connected to the control panel in parallel with each other (e.g., through a "daisy chain" wiring configuration), and/or through a "home-run" wiring configuration between the connection interfaces the protection module and each of the components in the field.

Furthermore, in some cases, each of the respective components in the field can be configured to operate on an "all master" basis. For example, an authorized user arming one of the system keypads (e.g., with an authorized user code), in turn causes all of the connected system keypads to arm simultaneously. Conversely, disarming one of the system keypads, (e.g., with an authorized user code) in turn causes all of the connected system keypads to disarm simultaneously.

In some cases, information regarding the alarm system (including information regarding the protection module) can be displayed at one or more of the keypads. For example, each keypad can display the state of the alarm system (e.g., whether the alarm system is armed, disarmed, or by-passed), whether any of the data buses are damaged (e.g., whether the protection module has detected a fault condition—such as a thermal or electrical event—with respect to one of the data buses, whether the protection module has isolated one of the data buses with respect to the other data buses, and so forth), the power status of the alarm system (e.g., whether the components of the alarm system are powered, whether one or more batteries installed in the alarm system are charged), and so forth. In some cases, each keypad can include one or more indicator lights, display screens, liquid crystal displays, vacuum fluorescent displays, or other display devices to present information visually to a user. In some cases, each keypad can include a speaker to present auditory information to a user.

In some cases, each data bus can be isolated so that it is energized directly from a control panel. However, if the protection module detects a failure condition (e.g., a shorted condition, or an inrush of current), the protection module can be configured to prevent the inrush of current from propagating into any of the other data buses.

In some cases, a data bus can universally serve all system keypads, and the multiplex output in this configuration can be an "all master" system. For example, once the keypads are connected to the system, they can be "learned" into the system automatically (e.g., automatically recognized by the control panel. As another example, each system keypad can have a unique identifier, and an installer can manually add the keypads to the alarm system by inputting each identifier into the control panel.

Figure 4:
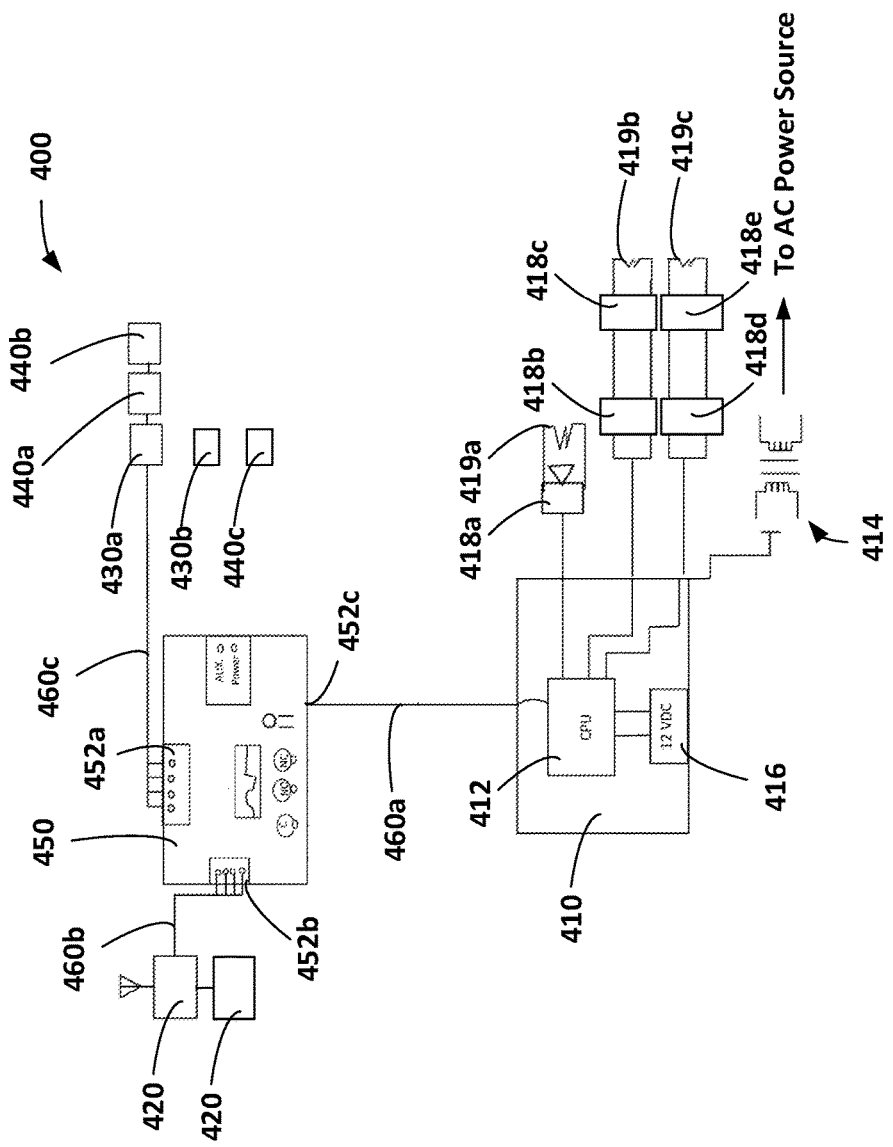
FIG. 4 is a diagram of another example alarm system having a protection module.

Another example alarm system 400 having a protection module is shown in FIG. 4. In some respects, the alarm system 400 can be similar to the alarm system 200 described with respect to FIG. 2. For example, the alarm system 400 includes a control panel 410, a communications module 420, sensors 430a and 430b, keypads 440a-c, a wireless receiver 470, and a protection module 450. A data bus 460a communicatively couples the control panel 410 to the protection module 450. The protection module 450 is in turn communicatively coupled to the communications module 420 and the wireless receiver 470 by a second data bus 460b, and communicatively coupled to the sensor 430a and the keypads 440a and 440b by a third data bus 460c. The wireless sensor 430b and wireless keypad 440c are communicatively coupled to the wireless receiver 470.

Similarly, the protection module 450 is operable to receive commands from the control panel 410 addressed to the communications module 420, wireless receiver 470, sensors 430a and 430b, and/or keypads 440a-c from the data bus 560a, and is operable to transmit the commands to the appropriate component. Further, the protection module 450 receives data from the communications module 420, wireless receivers 470, sensors 430a and 430b, and/or keypads 440a-c from the data buses 560b-c, and transmits the data to the control panel 410. However, as the communications module 420 is on a different data bus than that of the sensor 430a and keypads 440a-b, localized damage to one data bus is less likely to damage the other data bus.

The control panel 410 includes a CPU 412 that controls the operation of the control panel 410. For example, the CPU 412 can receive data from the other components of the alarm system (e.g., the communications module 420, wireless receiver 470, the sensors 430a and 430b, the keypads 440a-c, and/or the protection module 450), process the data, and transmit commands to each of the components of the alarm system.

The control panel 410 is powered through an AC-DC transformer 414, which converts AC power from an AC power source (e.g., a household electrical system) into DC power. The control panel 410 also includes a backup power source 416 (e.g., a 12 VDC battery) that provides the control panel 410 with power in the event that the AC power source fails.

The control panel 410 is coupled to several notification devices 418a-e. Warning devices 418a-e generate visual and/or auditory alerts to the occupants to a premises to warn them of potential dangerous conditions. For example, in response to dangers such as smoke, fire, or security breaches, an alarm system can notify users through auditory and/or visual warnings. In response, the user can take an appropriate course of action. Example notification devices 418a-e include speakers, sirens, warning lights (e.g., strobe lights), "sounders," or other such devices.

In some cases, one or more notification devices can be electrically connected in parallel with an end of line resistor, such that the control panel 410 can monitor the integrity of each of the notification devices. For example, as shown in FIG. 4, the notification device 418a is connected in parallel with an end of line resistor 419a, the notification devices 418b-c are connected in parallel with an end of line resistor 418b, and the notification devices 418d-e are connected in parallel with an end of line resistor 418c.

Each of the notification devices 418a-e is polarized, such that current can only flow in one direction through it. When the polarization of the current aligns with that of the notification device, current flows through the notification device and activates it. In response, the notification device generates a notification. When the polarization of the current does not align with that of the notification device, current cannot flow through the notification device. As a result, the notification device is inactive, and does not generate a notification.

When a current applied to an electric circuit is not aligned with that of the notification devices, electric current does not flow through those notification devices. However, electric current flows through the end of line resistor, and returns to the control panel 410. Alternatively, when the electric current applied to an electric circuit is aligned with that of the notification devices, electric current flows through those notification devices. Thus, electric current also returns to the control panel 410. However, if the electric circuit is damaged such that it cannot carry current properly (e.g., due to open or shorted wiring) or only intermittently carries current (e.g., if the conductive elements of the electric circuit provide an intermittent connection), the amount of current that returns of the control panel 410 will differ from the expected amount (e.g., zero returning current, or intermittently varying returning current). Thus, based on the electric current that returns from an electric circuit, the control panel 410 can determine if the electric circuit is functioning properly. In some cases, the control panel 410 can differentiate between different circuit conditions, such as an open condition, a grounded condition, or a shorted condition.

The protection module 450 can be similar to the protection modules 210 and 300 described with respect to FIGS. 2 and 3. For example, the protection module 450 is operable to receive commands from the control panel 410 addressed to the communications module 420, wireless receiver 470, sensors 430a and 430b, and/or keypads 440a-c from the data bus 460a, and is operable to transmit the commands to the appropriate component. Further, the protection module 450 receives data from the communications module 420, wireless receiver 470, sensors 430a and 430b, and/or keypads 440a-c from the data buses 460b and 460c, and transmits the data to the control panel 410. However, as the communications module 420 is on a different data bus than that of the sensors 430a and 430b and keypads 440a-c, localized damage to one data bus is less likely to damage the other data bus.

Similarly, protection module 450 can include protective mechanisms that thermally and/or electrically isolate one data bus from another. Thus, thermal and/or electrical damage to one data bus does not propagate into any of the other data buses. For example, the protection module 450 can include one or more thermal breakers and/or fuses that thermally and/or electrically isolate one data bus from another in response to a thermal event (e.g., an increase in temperature) and/or an electrical event (e.g., a short circuit or an in-rush of current).

Similarly, the protection module can include connection interfaces 452a-c to provide physical interfaces for communicatively coupling the protection module 450 to one or more of the data buses.

In some cases, the connection interfaces 452a-c can be provided with a "normally open" configuration. For example, during normal operation, a connection interface 452a-c provides an open circuit. If the protection module 450 detects a fault condition, the signal output interface provides a closed circuit. Conversely, in some implementations, a connection interface 452a-c can be provided with a "normally closed" configuration. For example, during normal operation, a connection interface 452a-c provides a closed circuit. If the protection module 450 detects a fault condition, the signal output interface provides an open circuit. Thus, in some cases, communication between the control panel 410 and the protection module 450 can be provided in the form of circuits that open or closed based on the presence or absence of fault conditions. In some implementations, the protection module 450 can include both "normally closed" and "normally open" signal output interfaces, such that a user can select an appropriate interface during installation. For example, each signal output interface can include a common terminal, a "normally open" terminal," and a "normally closed" terminal (e.g., a form C contact capable of conveying an electric signal having a voltage of 12-18 VDC and a current of 1 amp, or through the use of a dry contact closure) and it can be electrically coupled between the protection module 450 and the control panel 410, using a subset of these appropriate terminals.

Some implementations of the subject matter and operations described in this specification can be implemented in digital electronic circuitry, or in computer software, firmware, or hardware, including the structures disclosed in this specification and their structural equivalents, or in combinations of one or more of them. For example, in some implementations, the control panel, the communications module, the wireless receiver, the sensors, the keypads, and/or the protection modules can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard, a keypad and/or a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

A number of embodiments have been described. Nevertheless, it will be understood that various modifications may be made without departing from the spirit and scope of the disclosure. Accordingly, other implementations are within the scope of the claims.

What is claimed is:

1. A protective device for an alarm system, the device comprising:
    a first connection interface configured to be coupled communicatively to a command module via a first communications bus;
    a second connection interface configured to be coupled communicatively to a communications module via a second communications bus, the communications module comprising a wireless radio, and
    a third connection interface configured to be coupled communicatively to one or more sensors or input devices via a third communications bus;
    wherein the protective device is operable to:
        receive, from a control module via the first communications bus, a first electrical signal corresponding to a command addressing the communications module, the command comprising instructions to transmit a message to a remote system,
        responsive to receiving the first electrical signal, transmit the first electrical signal to the communications module via the second communications bus,
        detect a fault condition with respect to the third communication bus, and
        responsive to detecting the fault condition, electrically isolate the first and second communications buses from the third communications bus.

2. The protective device of claim 1, wherein the fault condition is indicative of an electrical short along the third communications bus.

3. The protective device of claim 1, wherein the fault condition is indicative of an in-rush of electrical current into the third communications bus.

4. The protective device of claim 3, wherein the protective device is configured such that electrical isolation of the first and second communications buses from the third communications bus prevents the in-rush of electrical current from entering the first and second communications buses.

5. The protective device of claim 1, wherein the fault condition is indicative of a disruption of the third communications bus.

6. The protective device of claim 1, wherein the fault condition is indicative of a thermal event with respect to the third communications bus.

7. The protective device of claim 6, wherein the protective device is configured such that electrical isolation of the first and second communications buses from the third communications bus reduces a transfer of thermal energy from the third communications bus to the first and second communications buses.

8. The protective device of claim 1, wherein the third connection interface is configured to communicatively couple to a plurality of sensors and/or input devices via the third communications bus.

9. The protective device of claim 1, further comprising a fourth connection interface configured to be coupled communicatively to one or more additional sensors or input devices via a fourth communications bus.

10. The protective device of claim 9, wherein the protective device is configured to:
    detect a fault condition with respect to the fourth communication bus, and
    responsive to detecting the fault condition, electrically isolate the first, second, and third communications buses from the fourth communications bus.

11. The protective device of claim 1, wherein the protective device is configured to:
    receive, from one of the one or more sensors and/or input devices via the third communications bus, a second electrical signal corresponding to a message addressing the control module, and
    responsive to receiving the second electrical signal, transmitting the second electrical signal to the control module via the first communications bus.

12. The protective device of claim 1, further comprising:
    one or more fuses disposed between the second communications bus and the first and second communications buses,
    wherein the one or more fuses are operable to isolate the communications bus electrically from the first and second communications buses in response to the fault condition.

13. The protective device of claim 1, further comprising:
    one or more thermal breakers disposed between the second communications bus and the first and second communications buses,
    wherein the one or more thermal breakers are operable to isolate the communications bus electrically from the first and second communications buses in response to the fault condition.

14. The protective device of claim 1, wherein at least one of the first communications bus, second communications bus, or third communications bus comprises a RS485 two wire loop.

15. The protective device of claim 1, further comprising a fourth connection interface configured to be coupled communicatively to one or more additional devices via a fourth communications bus.

16. The protective device of claim 1, further comprising one or more indicator lights, wherein the one or more indicator lights are operable to indicate visually, to a user, the detection of the fault condition.

17. The protective device of claim 16, wherein the one or more indicator lights are operable to indicate visually, to the user, that the fault condition was detected with respect to the third communication bus.

18. The protective device of claim 1, wherein the first connection interface, the second connection interface, and the third connection interface each comprises four wiring terminals.

* * * * *